(12) United States Patent
Penna et al.

(10) Patent No.: US 11,909,472 B2
(45) Date of Patent: Feb. 20, 2024

(54) METHOD AND APPARATUS FOR SELECTION OF LINEAR COMBINATION COEFFICIENTS FOR PRECODING IN FREQUENCY-SELECTIVE CHANNELS

(71) Applicant: Samsung Electronics Co., Ltd., Gyeonggi-do (KR)

(72) Inventors: Federico Penna, San Diego, CA (US); Hyukjoon Kwon, San Diego, CA (US); Dongwoon Bai, San Diego, CA (US); Jaein Kim, Gyeonggi-do (KR); Junho Lee, Gyeonggi-do (KR); Hui Won Je, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 17/729,457

(22) Filed: Apr. 26, 2022

(65) Prior Publication Data
US 2023/0155642 A1 May 18, 2023

Related U.S. Application Data

(60) Provisional application No. 63/279,865, filed on Nov. 16, 2021.

(51) Int. Cl.
| | | |
|---|---|---|
| *H04L 5/12* | (2006.01) | |
| *H04B 7/0456* | (2017.01) | |
| *H04L 5/00* | (2006.01) | |
| *H04B 7/06* | (2006.01) | |

(52) U.S. Cl.
CPC ......... *H04B 7/0456* (2013.01); *H04B 7/0632* (2013.01); *H04L 5/0094* (2013.01)

(58) Field of Classification Search
CPC .... H04B 7/0456; H04B 7/0632; H04L 5/0094
USPC ........................................................ 375/262
See application file for complete search history.

(56) References Cited

U.S. PATENT DOCUMENTS

| | | |
|---|---|---|
| 7,764,931 B2 | 7/2010 | Kim et al. |
| 8,885,754 B2 | 11/2014 | Kim et al. |
| 10,009,088 B2 | 6/2018 | Rahman et al. |
| 10,200,103 B2 | 2/2019 | Rahman et al. |
| 10,659,118 B2 | 5/2020 | Rahman et al. |
| 10,879,970 B2 | 12/2020 | Zhan et al. |

(Continued)

FOREIGN PATENT DOCUMENTS

| | | |
|---|---|---|
| EP | 3 874 614 | 9/2021 |
| EP | 3 895 338 | 10/2021 |

(Continued)

*Primary Examiner* — Helene E Tayong
(74) *Attorney, Agent, or Firm* — The Farrell Law Firm, P.C.

(57) ABSTRACT

The disclosure provides a method of providing implicit channel state information (CSI) feedback from a user equipment (UE). The method includes determining a precoding matrix indicator (PMI) selection decision metric, selecting one of a sub-band (SB) linear combination coefficient (LCC) selection method, a wideband (WB) LCC selection method, or a sub-band group (SBG) LCC selection method, based on the determined PMI selection decision metric, determining, using the selected LCC selection method, PMI indices based on sub-bands configured by a base station, and transmitting the determined PMI indices to the base station.

26 Claims, 6 Drawing Sheets

(56) References Cited

U.S. PATENT DOCUMENTS

| | | |
|---|---|---|
| 11,165,483 B2 | 11/2021 | Wang et al. |
| 2011/0243017 A1* | 10/2011 | Prasad ................ H04W 72/542 370/252 |
| 2012/0270535 A1* | 10/2012 | Chen .................... H04B 7/0486 455/422.1 |
| 2020/0106491 A1 | 4/2020 | Wu et al. |
| 2021/0194547 A1 | 6/2021 | Jin et al. |
| 2021/0258058 A1 | 8/2021 | Wu et al. |
| 2022/0094400 A1* | 3/2022 | Hao ..................... H04B 7/0658 |
| 2023/0009991 A1* | 1/2023 | Liu ..................... H04B 7/0456 |

FOREIGN PATENT DOCUMENTS

| | | | |
|---|---|---|---|
| WO | WO 2020/092340 | | 5/2020 |
| WO | WO 2020/119749 | | 6/2020 |
| WO | WO 2020/155116 | | 8/2020 |
| WO | WO 2020/172768 | | 9/2020 |
| WO | WO 2021/032263 | | 2/2021 |
| WO | WO 2021/066534 | | 4/2021 |
| WO | WO 2021068915 | * | 4/2021 |
| WO | WO 2021/083157 | | 5/2021 |
| WO | WO 2021/090109 | | 5/2021 |
| WO | WO 2021/147078 | | 7/2021 |

* cited by examiner

METHOD AND APPARATUS FOR SELECTION OF LINEAR COMBINATION COEFFICIENTS FOR PRECODING IN FREQUENCY-SELECTIVE CHANNELS

CROSS-REFERENCE TO RELATED APPLICATION(S)

This application is based on and claims priority under 35 U.S.C. § 119(e) to U.S. Provisional Patent Application Ser. No. 63/279,865, which was filed in the U.S. Patent and Trademark Office on Nov. 16, 2021, the entire content of which is incorporated herein by reference.

FIELD

The disclosure relates generally to precoding matrix indicator (PMI) selection, and more particularly, to linear combination coefficient (LCC) matrix selection that is compliant with an eType-II codebook.

BACKGROUND

In the downlink (DL) of multiple-input multiple-output (MIMO) wireless communication systems such as long term evolution (LTE) or $5^{th}$ generation (5G) new radio (NR), when operating in a frequency division duplexing (FDD) mode, precoding at a base station (or a "gNB" in NR), which may align transmitted data streams to dominant channel eigen-modes, is made possible by channel state information (CSI) feedback from a user equipment (UE). More specifically, precoder selection by the base station for the precoding relies on implicit CSI feedback sent by the UE to the base station. Implicit CSI feedback occurs when the UE, instead of reporting an entire channel matrix, reports an index of a preferred precoding matrix selected from a predefined codebook, known at both the base station and the UE. In NR, such an index is referred to as a PMI.

It is up to UE implementation as to how to determine the best PMI for current channel conditions. The disclosure provides methods for a UE to determine a PMI.

Specifically, the disclosure considers a PMI codebook structure such as an eType-II codebook defined in NR Rel-16 (hereinafter, "an NR-compliant codebook"), where the precoding matrix consists of the product of three components:
  a beam selection matrix,
  an LCC matrix, and
  a frequency decompression matrix.

The beam selection matrix is wideband, i.e., the selected beams are common to all sub-bands (denoted by $N_3$, i.e., the number of sub-bands). The LCCs, on the other hand, vary for different sub-bands. However, instead of selecting a specific LCC matrix for each individual sub-band (which may result in excessive overhead), the LCC matrix contains $M < N_3$ frequency components (or discrete Fourier transform (DFT) components), which are mapped to the $N_3$ sub-bands by the frequency decompression matrix.

Conventionally, the LCC selection is performed as follows.

Initially, individual LCC matrices are determined for each of the $N_3$ sub-bands. Thereafter, compression to $M < N_3$ frequency components is determined by choosing the M DFT components that capture the most energy out of the $N_3$ original LCCs. Herein, this procedure will be referred to as a "sub-band (SB) LCC selection".

Based on further analysis, however, it has been determined that this procedure is not optimal. For example, in highly frequency selective channels (such as extended vehicular A (EVA) or extended typical urban (ETU) channel profiles), because the compression from $N_3$ to M components incurs significant losses, the compressed LCCs do not accurately reflect the frequency variations of the channel in each of the $N_3$ sub-bands.

SUMMARY

Accordingly, this disclosure is provided to address at least the problems and/or disadvantages described above and to provide at least some of the advantages described below.

An aspect of the disclosure is to provide a new LCC selection methods that, instead of computing the LCCs individually for each sub-band and then compressing them, computes a single LCC matrix for an entire band (herein, referred to as "wideband (WB) LCC selection") or for groups of sub-bands (herein, referred to as "sub-band grouping (SBG) LCC selection"). The derivation is based on maximizing an upper bound of the channel capacity.

The resulting PMI is fully compliant with the eType-II PMI feedback structure. In other words, the WB LCC or SBG LCC matrices can be mapped to an NR-compliant codebook, in a transparent manner for the base station. As such, the disclosure does not require changes in the existing NR Rel-16 Specifications.

Another aspect of the disclosure is to provide an adaptive LCC selection method that automatically switches between legacy, WB, and SBG LCC selection depending on a metric that measures LCC energy captured by DFT compression. As a result, if the gNB configures eType-II codebook under unfavorable channel conditions for LCC compression, the UE can recast (transparently to the gNB) its LCC feedback to be WB or SBG.

In accordance with an aspect of the disclosure, a method is provided for a UE. The method includes determining a PMI selection decision metric; selecting one of an SB LCC selection method, a WB LCC selection method, or an SBG LCC selection method, based on the determined PMI selection decision metric; determining, using the selected LCC selection method, PMI indices based on sub-bands configured by a base station; and transmitting the determined PMI indices to the base station.

In accordance with another aspect of the disclosure, a UE is provided, which includes a transceiver; and a processor configured to determine a PMI selection decision metric, select one of an SB LCC selection method, a WB LCC selection method, or an SBG LCC selection method, based on the determined PMI selection decision metric, determine, using the selected LCC selection method, PMI indices based on sub-bands configured by a base station, and transmit, via the transceiver, the determined PMI indices to the base station.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
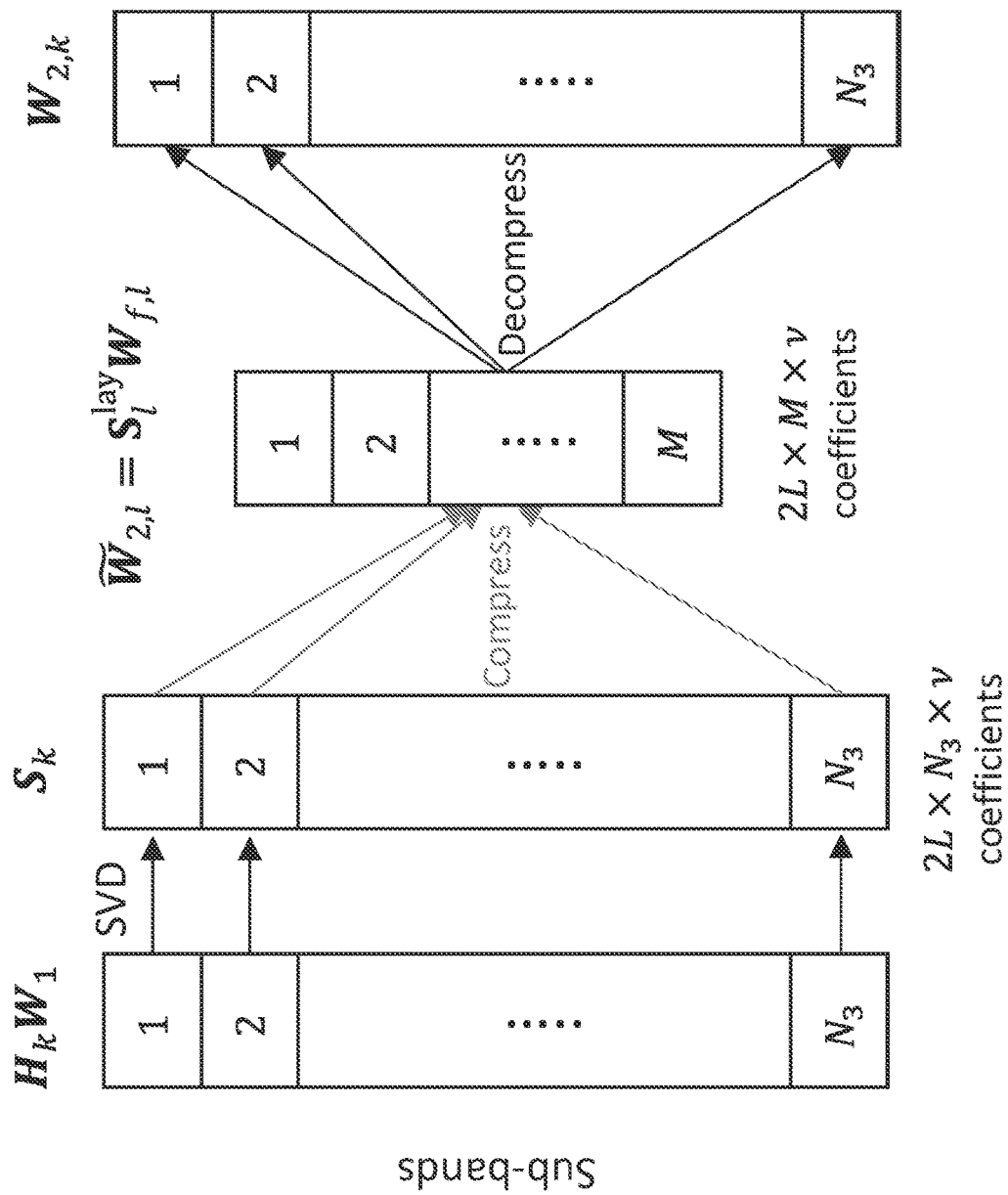
FIG. 1 illustrates an SB LCC selection method.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device according to one embodiment may be one of various types of electronic devices. The electronic devices may include, for example, a portable communication device (e.g., a smart phone), a computer, a portable multimedia device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "1st," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

Hereinafter, the following selection procedures are described:

1. WB LCC selection: a single LCC matrix is computed for the entire band and mapped to NR-compliant (e.g., eType-II codebook) PMI indices.
2. SBG LCC selection: a set of $N_g$ LCC matrices are computed for $N_g \leq M$ sub-band groups, and mapped to the NR-compliant PMI indices.
3. Adaptive LCC selection: a method for automatically choosing the LCC selection mode (legacy, WB, or SBG) according to proposed metrics that measures the LCC energy captured by DFT compression or based on capacity comparisons.

As will be described below, these selection procedures can improve eType-II PMI selection performance under frequency selective channels (e.g., EVA, ETU, etc.).

Additionally, to avoid degradation over channels with low frequency selectivity (e.g., EPA), the adaptive LCC selection may selectively apply WB/SBG methods when beneficial, while switching back to legacy methods in other cases.

Although embodiments of the disclosure are described below utilizing DFT-based compression, the disclosure is not limited thereto, and other compression techniques are possible.

Conventional SB LCC Selection Method

Let L be the number of beams, v the number of layers, $N_T=2N_1N_2$ the number of CSI-RS ports (where $N_1$ and $N_2$ are the numbers of horizontal and vertical antennas, respectively, and the number 2 accounts for cross-polarized antennas), $N_3$ the number of PMI sub-bands before compression, and M the number of frequency domain (FD) components after compression.

For a certain layer $l \in \{1, \ldots, v\}$, the eType-II precoder is given by Equation (1).

$$W_l^{(lay)} = W_1 \tilde{W}_{2,l} W_{f,l}^H \quad (1)$$

In Equation (1), $W_1 \in \mathbb{C}^{N_T \times 2L}$ is a wideband and layer-common beam selection matrix, $\tilde{W}_{2,l} \in \mathbb{C}^{2L \times M}$ is a matrix of compressed LCCs, and $W_{f,l} \in \mathbb{C}^{N_3 \times M}$ is a DFT compression matrix.

From this, Equation (2) can be written.

$$W_{f,l} = F(:,M_{init}+[0m_l]) \quad (2)$$

In Equation (2), F is a full $N_3 \times N_3$ DFT matrix, out of which M columns identified by $M_{init}$ (common to all layers) and by vector $m_l \in \mathbb{N}^{M-1}$ (layer-specific) can be selected.

In Equation (1), $W_l^{(lay)} \in \mathbb{C}^{N_T \times 2L}$ represents the precoder a single layer and for all sub-bad.

The eType-II precoder can also be expressed for all layers and for a given sub-band k, by defining a matrix $W_k^{(SB)} \in \mathbb{C}^{N_T \times v}$. This expression may be more useful for the formulation of a capacity optimization problem for which Equation (3) can be written.

$$W_k^{(SB)} = W_1[\tilde{W}_{2,1} W_{f,1}^H(:,k) \ldots \tilde{W}_{2,v} W_{f,v}^H(:,k)] \quad (3)$$

Now, Equations (4) and (5) can be defined:

$$\tilde{W}_2 \overset{def}{=} [\tilde{W}_{2,1} \ldots \tilde{W}_{2,v}] \in \mathbb{C}^{2L \times Mv} \quad (4)$$

$$D_k \overset{def}{=} \begin{bmatrix} f_k(M_{init}, m_1) & & \\ & \ddots & \\ & & f_k(M_{init}, m_v) \end{bmatrix} \in \mathbb{C}^{Mv \times v} \quad (5)$$

In Equation (5), $$f_k(M_{init}, m_l) \overset{def}{=} (F(k, M_{init}+[0m_l]))^H \in \mathbb{C}^{M \times 1} \quad (6)$$

With this new notation, Equation (3) can be rewritten as Equation (7).

$$W_k^{(SB)} = W_1 \tilde{W}_2 D_k \quad (7)$$

FIG. 1 is a block diagram of SB LCC selection method.

Referring to FIG. 1, a UE receives a configuration of a plurality of sub-bands $(1, 2, \ldots, N_3)$ and performs singular value decomposition (SVD) on each of the $N_3$ sub-bands. Thereafter, the UE must perform compression for each sub-band to arrive at the M FD components, which are reported to the base station for decompression and identification of the LCC matrices $W_{2,k}$.

More specifically, the SB LCC selection method proceeds as follows.

Step 1. The per-SB capacity optimization problem is formulated for each $k \in 1, \ldots, N_3$ as shown in Equation (8), where $E_k \overset{def}{=} H_k W_1$.

$$S_k = \underset{W_{2,k}}{\operatorname{argmax}} \log \det(I + \rho(E_k W_{2,k})(E_k W_{2,k})^H), \quad (8)$$

which has a closed-form solution, given by $S_k \in \mathbb{C}^{2L \times v}$ equal to the first v right singular vectors of $E_k$.

Step 2. For each layer l, define $$S_l^{lay} \triangleq [S_1(:,l) \ldots S_{N_3}(:,l)] \in \mathbb{C}^{2L \times v} \quad (9)$$

The M compression vectors $w_{f,l,1}, \ldots, w_{f,l,M}$, i.e., the columns of matrix $W_{f,l}$ in Equation (2), are selected by $w_{f,l,j} = f_{i_{l,j}}$ for $j \in \{1, \ldots, M\}$, with $$\{i_{l,1}, \ldots, i_{l,N_3}\} = \operatorname{sort}_{i \in \{1, \ldots, N_3\}} \|s_l^{lay} f_i\|^2, \quad (10)$$

where $f_1, \ldots, f_{N_{SB}}$ are columns of the DFT matrix F in Equation (2), and $\operatorname{sort}_i(x_i)$ returns the indices of the arguments $x_i \in \mathbb{R}$ sorted in decreasing order. Then, given the vectors $w_{f,l,j}$ and $S_l^{lay}$ the compressed LCCs $\tilde{W}_{2,l}$ are obtained by:

$$\tilde{W}_{2,l} = S_l^{lay} W_{f,l} \quad (11)$$

Further, the above-described SB LCC selection method is intrinsically suboptimal because it decouples the problem in two steps. Performance of the SB LCC selection method tends to degrade as the frequency selectivity increases, and as $M << N_3$ (which is typically the case in NR Rel-16). For example, under frequency selective channels, the optimal per-SB coefficients vary across SBs. Therefore, the compression of $2LN_3 v$ coefficients to $2LMv$ (ratio: $N_3/M$) is necessarily lossy, regardless of the chosen compression basis.

To address the above and other issues present in the conventional SB LCC selection method, the following selection methods are provided.

WB LCC Selection Method

In the WB LCC selection method, a single LCC matrix is computed for the entire band and mapped to NR-compliant (e.g., eType-II codebook) PMI indices.

Instead of solving the optimization problem for each SB, i.e., finding the best $\tilde{W}_2$ and $D_k$ for each sub-band k, it is assumed that $W_2 = \tilde{W}_2 D_k$ is wideband (common to all sub-bands, i.e., does not depend on k). With this assumption, a capacity optimization problem can be formulated as in Equation (12).

$$V = \underset{W_2}{\operatorname{argmax}} \sum_{k=1}^{N_3} \log \det(I + \rho(E_k W_2)(E_k W_2)^H) \quad (12)$$

An approximate solution is proposed to the WB capacity optimization problem in Equation (8) by applying an upper bound. Then, using the Weinstein-Aronszajn identity, Equation (12) can be rewritten as Equations (13) and (14).

$$V = \underset{W_2}{\operatorname{argmax}} \sum_{k=1}^{N_3} \log \det(I + \rho(E_k W_2)^H(E_k W_2)) \quad (13)$$

$$= \underset{W_2}{\operatorname{argmax}} \frac{1}{N_3} \sum_{k=1}^{N_3} \log \det(I + \rho W_2^H E_k^H E_k W_2) \quad (14)$$

Because of the concavity of log det(X), Equations (15) and (16) are as follows.

$$\frac{1}{N_3}\sum_{k=1}^{N_3}\log\det(I+\rho W_2^H E_k^H E_k W_2) \le \log\det\left(\frac{1}{N_3}\sum_{k=1}^{N_3}(I+\rho W_2^H E_k^H E_k W_2)\right) \quad (15)$$

$$= \log\det\left(I+\rho W_2^H\left(\frac{1}{N_3}\sum_{k=1}^{N_3}E_k^H E_k\right)W_2\right) \quad (16)$$

Equation (12) is an upper bound of the original capacity function. The upper bound of Equation (12) is maximized with respect to $W_2$ by the eigenvectors of $$\frac{1}{N_3}\sum_{k=1}^{N_3}E_k^H E_k = W_1^H\left(\frac{1}{N_3}\sum_{k=1}^{N_3}H_k^H H_k\right)W_1.$$

The approximate solution to Equation (12) is shown in Equation (17).

$$V = EVD\left(W_1^H\left(\frac{1}{N_3}\sum_{k=1}^{N_3}H_k^H H_k\right)W_1\right) \quad (17)$$

In Equation (13), EVD(X), which represents eigenvalue decomposition, is a function that returns a $2L\times v$ matrix whose columns are the v dominant eigenvectors of X.

Though simulation, it has been verified that the upper bound of the WB capacity in Equation (16) is tight. Therefore, the solution of Equation (17) is sufficiently accurate. However, it is possible to further refine the solution by gradient descent.

Exploiting the fact that log det(X) is differentiable, i.e., as shown in Equation (18):

$$\nabla \log\det(X)=(X^{-1})^T, \quad (18)$$

the gradient can be computed in Equation (19):

$$f(W_2) = \frac{1}{N_3}\sum_{k=1}^{N_3}\log\det(I+\rho W_2^H E_k^H E_k W_2) \quad (19)$$

with respect to $W_2$, starting from $W_2=V$, and iteratively optimize $W_2$ by gradient descent.

Below, it is shown that the solution $V\in \mathbb{C}^{2L\times v}$ to the wideband capacity optimization problem of Equation (17) can be mapped one-to-one to NR-compliant eType-II LCC $(\tilde{W}_{2,l}W_{f,l}^H)$.

As a preliminary step, per-layer phase rotation is applied as shown in Equation (20).

$$V' = V\cdot\begin{bmatrix}e^{-j\phi_1} & & \\ & \ddots & \\ & & e^{-j\phi_v}\end{bmatrix} \quad (20)$$

In Equation (16), $\phi_j=\angle V(1,j)$.

Thereafter, mapping of V' to $\tilde{W}_{2,l}W_{f,l}^H$ is done as follows:
For each layer l, set $\tilde{W}_{2,l}=[V'(:,1)\ 0_{2L\times(M-1)}]$.
Set $M_{init}=1$, so that, for all layers l, $$W_{f,l}(:,1) = \frac{1}{\sqrt{N_3}}1;$$

in order words, $$W_{f,l}^H = \frac{1}{\sqrt{N_3}}\exp\left(\frac{j2\pi}{N_3}\begin{bmatrix}0 & \cdots & 0 \\ \vdots & X & X \\ 0 & X & X\end{bmatrix}\right).$$

The choice of $\{m_l\}_{l=1}^v$ does not matter as long as $M_{init}=1$.
Without loss of generality, $m_l=[2, \ldots, M]$ is set.
With these steps, the resulting precoder (before quantization) for each sub-band k may be determined using Equation (21).

$$W=W_1[\tilde{W}_{2,1}W_f^H(:,k)\ \ldots\ \tilde{W}_{2,v}W_f^H(:,k)]=W_1V'\in \mathbb{C}^{N_T\times v} \quad (21)$$

As shown above, for all sub-bands, the LCC matrix is equal to the desired EVD-based precoder V'. That is, WB LCC may be applied to eType-II PMIs in a transparent manner (i.e., the PMI maintains the same formal structure as the NR-compliant eType-II codebook with FD compression).

Up to this point, there is no compression loss from V' to $\tilde{W}_{2,l}W_{f,l}^H$ in Equation (21). In contrast, in the legacy eType-II method, there is a compression loss when mapping the $2L\times N_3\times v$ coefficients $V_k$ to $2L\times M\times v$ compressed coefficients, with $M<N_3$.

As required by the NR standard Specification, amplitude and phase quantization are applied to the elements of $\tilde{W}_{2,l}$ and report $K_0=\beta 2LM$ non-zero coefficients. Note that $2L(M-1)$ coefficients in $\tilde{W}_{2,l}$ are already zero, so if $$\beta \ge \frac{1}{M}$$

(which is typically the case), all coefficients are reported. Therefore, only quantization plays a role here.

Figure 2:
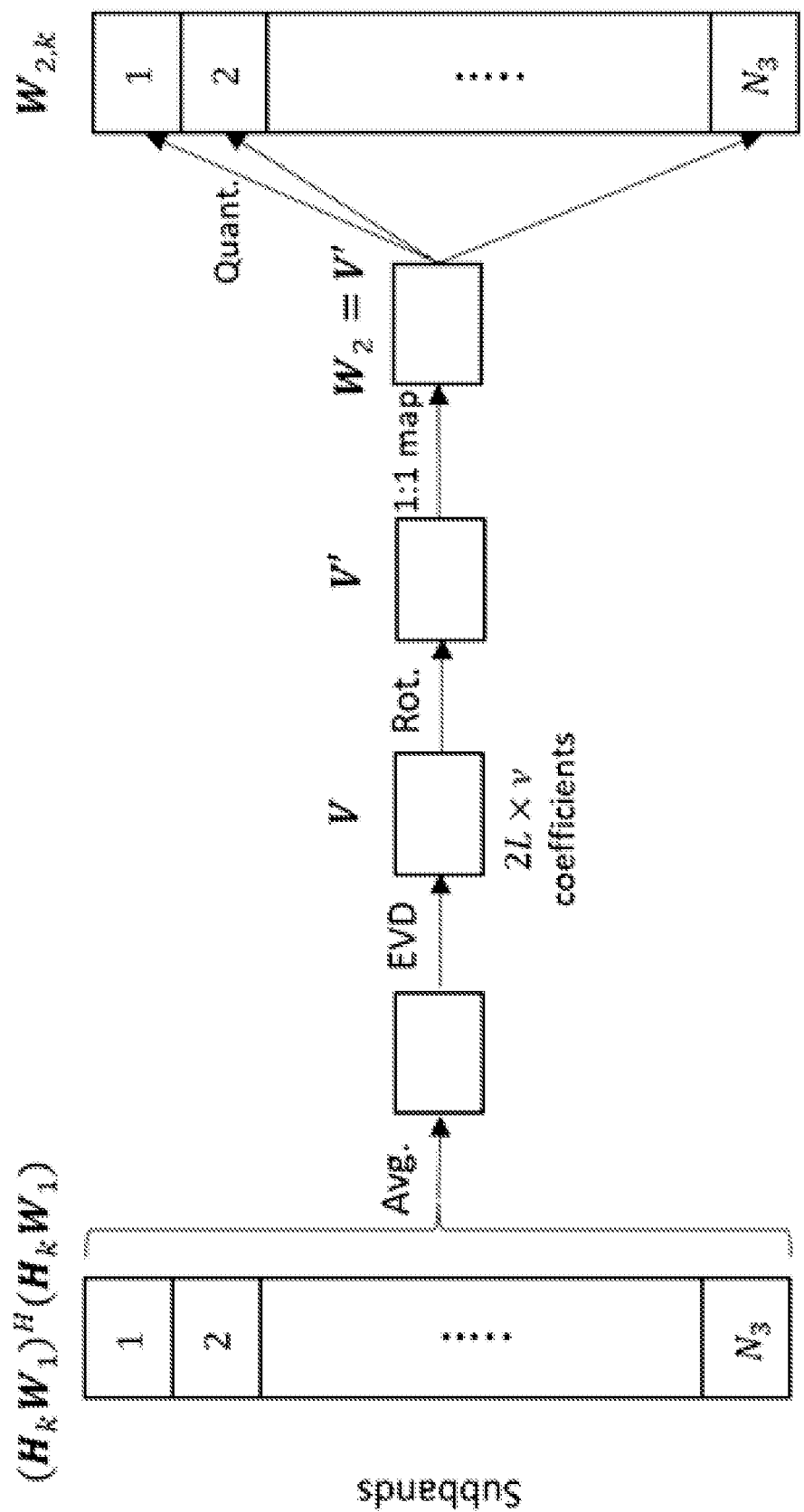
FIG. 2 illustrates a WB LCC selection method, according to an embodiment.

FIG. 2 illustrates a WB LCC selection method, according to an embodiment.

Referring to FIG. 2, instead of solving the optimization problem for each of the $N_3$ SBs as illustrated in FIG. 1, an average of the $N_3$ SBs is determined and then the UE performs EVD on the determined average, which returns a $2L\times v$ matrix whose columns are the v dominant eigenvectors of X (e.g., see Equation (17) above).

Thereafter, the UE performs per-layer phase rotation and one-to-one maps the phase rotated values an NR-compliant PMI indices, which are then reported to the base station.

SBG LCC Selection Method

In SBG LCC selection, a set of $N_g$ LCC matrices may be computed for $N_g\le M$ sub-band groups, and mapped to the NR-compliant PMI indices.

To simplify the notation, denote by $w\in \mathbb{C}^{1\times N_3}$ single row of $W_2$ and by $\tilde{w}\in \mathbb{C}^{1\times M}$ a row of $\tilde{W}_2$. In addition, the layer index l may be omitted, to provide:

$$w=\tilde{w}W_f^H \quad (22)$$

In Equation (22), $W_f=F_{N_3}(:,b)\in \mathbb{C}^{N_3\times M}$ contains M chosen DFT bases indexed by vector $b\in\{0, \ldots, N_3-1\}^M$, and $F_N\in \mathbb{C}^{N\times N}$ is a full DFT matrix of size N.

As an example, let $N_3=8$ and $M=4$.
Suppose a precoder $w_{target}$ with sub-band grouping is desired, e.g., $$w_{target}=[a\ b\ c\ d\ a\ b\ c\ d] \quad (23)$$

or $$w_{target}=[a\ a\ b\ b\ c\ c\ d\ d] \quad (24)$$

In order to set $\tilde{w}$ and $b$ such that $w=w_{target}$, and to determine the conditions for $w=w_{target}$ to be achievable, the following procedure may be used.

The DFT of $w_{target}$ may be computed by Equation (25).

$$\tilde{w}_{N_3} = w_{target} F_{N_3}. \quad (25)$$

Denote by $[i_1, \ldots, i_{M_{NZ}}]$ the indices of the non-zero elements of $\tilde{w}_{N_3}$. If $M_{NZ} \leq M$, then the desired precoder can be achieved using Equation (26):

$$w = w_{target} \quad (26)$$

by setting $$b(1: M_{NZ}) = [i_1, \ldots, i_{M_{NZ}}] \quad (27)$$

and $$\tilde{w} = [\tilde{w}_{N_3}(:[i_1, \ldots, i_{M_{NZ}}]) 0_{1 \times (M-M_{NZ})}] = [w_{target} F_{N_3}(:[i_1, \ldots, i_{M_{NZ}}]) 0_{1 \times (M-M_{NZ})}]. \quad (28)$$

The coefficients of $b(M_{NZ}+1:M)$ may be arbitrarily set, because these DFT bases are multiplied by zeros. By plugging Equations (27) and (28) into Equation (22), it can be verified that Equation (26) is satisfied. This condition is referred to herein as "lossless compression," because $w$ (length $N_3$) may be fully recovered from the compressed vector $\tilde{w}$ (length $M$).

As can be seen from Equation (27), lossless compression cannot be achieved if $M_{NZ}>M$, because $b$ has length $M$. Therefore, a condition for $w=w_{target}$ to be achievable is $M_{NZ} \leq M$.

Let $N_g$ be the number of sub-band groups, i.e., the number of different values in $w_{target}$. For example, in Equations (23) and (24), $N_g=4$. Then:

"Non-contiguous" SBG of the form $w_{target}=[\alpha_1 \alpha_2 \ldots \alpha_{N_g}, \ldots \alpha_1 \alpha_2 \alpha_{N_g}]$, such as in Equation (23), can be achieved with lossless compression if $N_3$ is an integer multiple of $N_g$ (which implies $M_{NZ}=N_g$) and by choosing $M \geq N_g$.

"Contiguous" SBG of the form $w_{target}=[\alpha_1 \ldots \alpha_1 \alpha_2 \ldots \alpha_2 \ldots \alpha_{N_g} \ldots a_{N_g}]$ with $N_g \geq 2$, such as in Equation (24), cannot be achieved with lossless compression by any $$M \leq \frac{N_3}{2}$$

(note that $$M > \frac{N_3}{2}$$

is not allowed by the current NR specification) because, for any $$N_g \geq 2, M_{NZ} > \frac{N_3}{2}.$$

Based on the results above, non-contiguous SBG may be the preferred option as it results in lossless compression (if the aforementioned conditions are satisfied). Contiguous SBG is also possible, but may result in lossy compression.

To implement SBG LCC selection, a similar approach is followed as the one applied to WB LCC selection, except that separate eigenvectors $V_i \in \mathbb{C}^{2L \times v}$ are estimated for each of the groups $i \in \{1, \ldots, N_g\}$. Specifically, let $$V_i = EVD\left(W_1^H \left(\frac{N_g}{N_3} \sum_{k=1}^{N_3/N_g} H_{i+N_g(k-1)}^H H_{i+N_g(k-1)}\right) W_1\right). \quad (29)$$

Let $V'_i$ be a phase-rotated version of $V_i$, similar to Equation (20), i.e., $$V'_i = V_i \cdot \begin{bmatrix} e^{-j\phi_{i,1}} & & \\ & \ddots & \\ & & e^{-j\phi_{i,v}} \end{bmatrix}. \quad (30)$$

In Equation (30), $\phi_{i,j} = \angle V(1,j)$.

Then, for each layer $l \in \{1, \ldots, v\}$, $$W_{target,l} = [V'_1(:l) \ldots V'_{N_g}(:l) \ldots V'_1(:l) \ldots V'_{N_g}(:l)] \in \mathbb{C}^{2L \times N_3}, \quad (31)$$

$W_{target,l}$ is mapped to $\tilde{W}_{2,l} W_{f,l}^H$ in the same way as in legacy eType-II, i.e., by selecting the M largest elements of $\|W_{target,l} F_{N_3}\|$, subject to the NR specification restrictions.

Adaptive LCC Selection Method

From simulation results, it can be observed that in certain scenarios (e.g., with highly frequency selective channels and high rank), WB and/or SBG LCC selection outperforms legacy eType-II LCC selection (i.e., SB LCC selection). However, in other scenarios (e.g., an EPA channel), SB LCC selection may perform better. Therefore, in accordance with an embodiment, a method is provided for determining when to apply SB LCC selection, WB LCC selection, or SBG LCC selection.

According to an embodiment, a ratio between LCC energy after FD compression and total LCC energy before FD compression may be used as a PMI selection decision metric for such a determination. Mathematically, this may be expressed by Equation (32).

$$r \stackrel{def}{=} \frac{\sum_{l=1}^{v} \|V^{(l)} W_{f,l}\|_F^2}{\sum_{l=1}^{v} \|V^{(l)}\|_F^2} \quad (32)$$

In Equation (32), $V_k \in \mathbb{C}^{2L \times v}$ is the SVD-based precoder for sub-band k, and $V^{(l)} = [V_1(:l) \ldots V_{N_3}(:l)] \in \mathbb{C}^{2L \times N_3}$.

This metric indicates how much energy is captured by FD compression. Therefore, the higher the metric, the better SB LCC selection is expected to perform. However, if the metric is low, SB LCC selection suffers from larger FD compression loss, which suggests that WB or SBG LCC selection may perform better. Accordingly, a switching criterion between SB LCC selection and WB or SBG LCC selection may be expressed by:

If $r > \gamma \rightarrow$ apply SB LCC selection. $N_3$

If $r \leq \gamma \rightarrow$ apply WB or SBG LCC selection.

The value of $\gamma$ can be optimized by simulations under different channels, or chosen adaptively based on estimated delay spread and/or Doppler frequency, or updated online.

Further, for deciding between WB and SBG, it can be observed that:

When $N_3$ is even and $N_3 < 19$ (i.e., when SB grouping achieves lossless compression), SBG outperforms WB by up to 0.5 dB or at least it is not worse than WB.

When $N_3$ is odd or $N_3 > 19$ (i.e., when lossless compression cannot be achieved by SB grouping), WB outperforms SBG by up to 1.2 dB.

Therefore, when r≤γ, a decision rule between WB or SBG selection is:

When $N_3$ is even and $N_3 < N_{MAX}$, apply SBG LCC selection.

Otherwise, apply WB LCC selection.

Note that the specific value of $N_{MAX}$ (e.g., 19) depends on codebook restrictions in NR Rel-16 Spec, and may change if aspect of the disclosure are applied to future versions of NR or to communication systems that follow different standards. Accordingly, while 19 is provided as an example for $N_{MAX}$ herein, the disclosure is not limited to this value.

According to another embodiment, an average capacity difference ($\Delta C_{avg}$) may be used as a PMI selection decision metric for such a determination. Mathematically, this may be expressed by Equation (33):

$$\Delta C_{avg} \stackrel{def}{=} \frac{1}{N_{SB}} \sum_{s=1}^{N_{SB}} (C_{SB-FDC,s} - C_{WB,s}) \quad (33)$$

Equation (33), $C_{SB-FDC,s} \stackrel{def}{=} \Sigma_{i \in SB_s} \log \det (I + \rho(H_i W_{SB-FDC,s})(H_i W_{SB-FDC,s})^H)$ and $C_{WB,s} \stackrel{def}{=} \Sigma_{i \in SB_s} \log \det(I + \rho(H_i W_{WB})(H_i W_{WB})^H)$.

If $\Delta C_{avg} > 0 \rightarrow$ apply SB LCC selection.
If $\Delta C_{avg} \leq 0 \rightarrow$ apply WB or SBG LCC selection.

Similar to using a ratio between LCC energy after FD compression and total LCC energy before compression may be used as a PMI selection decision metric, the determination of whether to use the WB or SBG LCC selection may be based on conditions for lossless compression being verified. That is, a decision rule between WB or SBG selection is:

When $N_3$ is even and $N_3 < N_{MAX}$, apply SBG LCC selection.

Otherwise, apply WB LCC selection.

A determination as to which PMI selection decision metric to be used may be performed in various ways, e.g., preset during UR manufacturing, signaled by the base station, determined by the UE based on system parameters and/or requirements, and the disclosure is not limited to a particular method.

Figure 3:
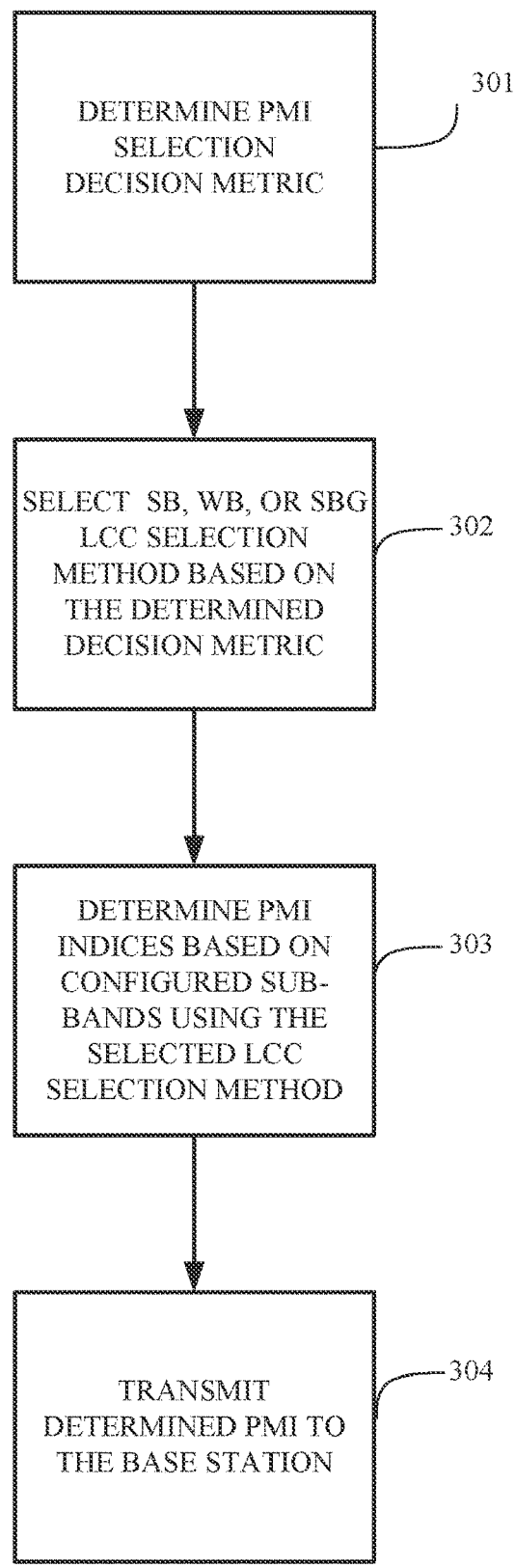
FIG. 3 is flowchart illustrating a method of selecting an LCC method, according to an embodiment.

FIG. 3 is flowchart illustrating a method of selecting an LCC method, according to an embodiment.

Referring to FIG. 3, an apparatus that is wirelessly connected to a base station, e.g., a UE, determines a PMI selection decision metric in step 301.

In step 302, the UE selects one of an SB LCC selection method, a WB LCC selection method, or an SBG LCC selection method, based on the determined PMI selection decision metric.

In step 303, the UE determines PMI indices based on the configured sub-bands using the selected LCC selection method, e.g., as illustrated in FIG. 2, when the WB LCC selection method is selected.

In step 304, the UE transmits the determined PMI indices to the base station.

Figure 4:
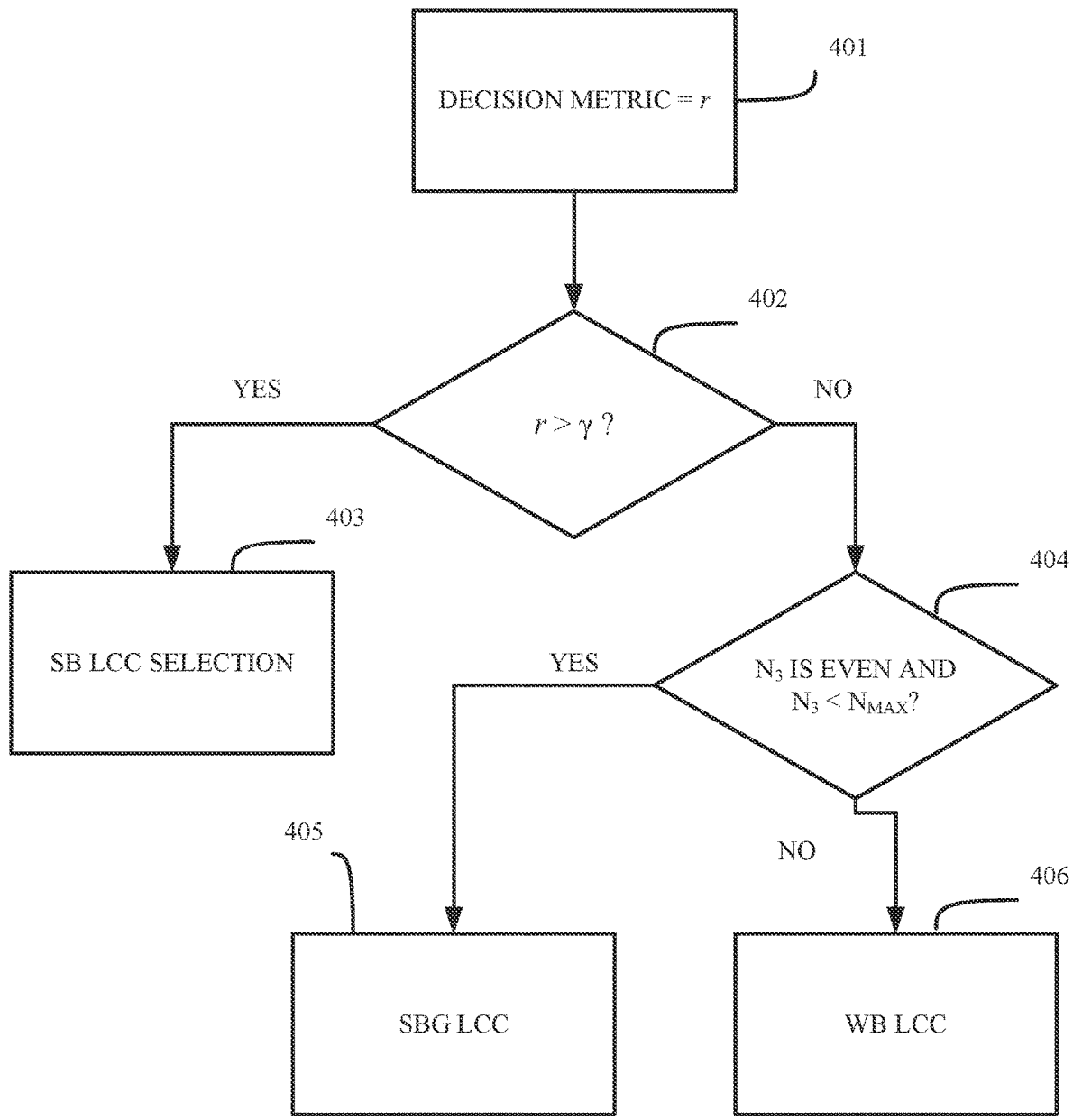
FIG. 4 is flowchart illustrating a method of selecting an LCC method based on first decision metric, according to an embodiment.

FIG. 4 is flowchart illustrating a method of selecting an LCC method based on first decision metric, according to an embodiment. Specifically, FIG. 4 illustrate a method of selecting an LCC method based on a ratio between LCC energy after FD compression and total LCC energy before FD compression.

Referring to FIG. 4, in step 401, the UE determines the PMI selection decision metric as the ratio between LCC energy after FD compression and total LCC energy before FD compression (r), e.g., as shown above in Equation (28).

In step 402, the UE compares the ration with a threshold (γ), which can be optimized by simulations under different channels, chosen adaptively based on estimated delay spread and/or Doppler frequency, updated online, etc.

If the ratio is greater than the threshold (r>γ) in step 402, then the UE selects the SB LCC selection method in step 403. However, if the ratio is not greater than the threshold (r≤γ) in step 402, then the UE selects the WB LCC selection method or the SBG LCC selection method in steps 404 to 406.

More specifically, in step 404, the UE determines if $N_3$ is even and $N_3 < N_{MAX}$. As described above, when $N_3$ is even and $N_3 < N_{MAX}$, an SB grouping achieves lossless compression, and SBG LCC selection may outperform WB LCC selection by up to 0.5 dB or is at least no worse than WB LCC selection.

Accordingly, if $N_3$ is even and $N_3 < N_{MAX}$ in step 404, then the UE selects the SBG LCC selection method in step 405. However, if $N_3$ is odd or $N_3 \geq N_{MAX}$ in step 404, then the UE selects the WB LCC selection method in step 406.

Figure 5:
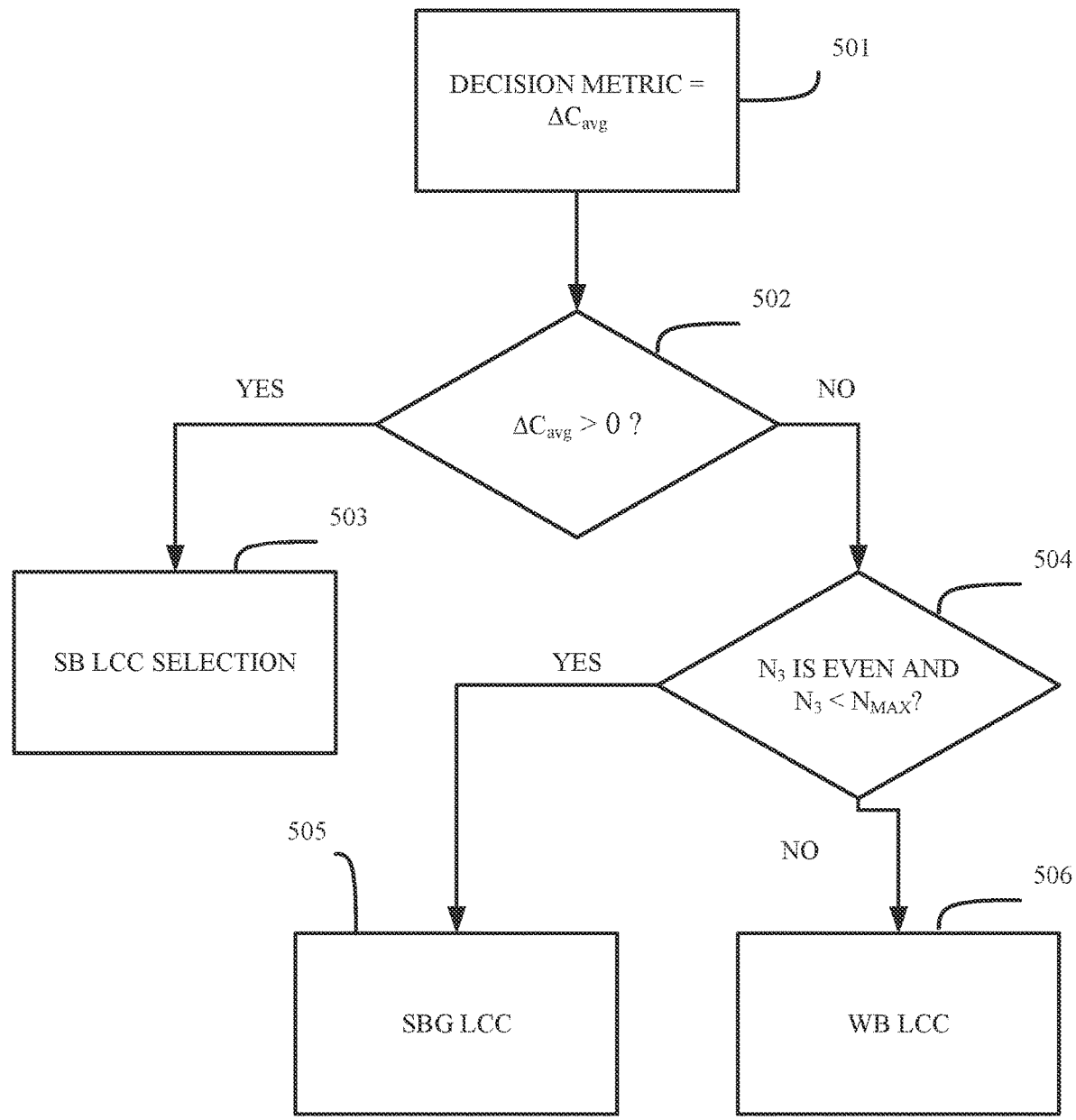
FIG. 5 is flowchart illustrating a method of selecting an LCC method based on a second decision metric, according to an embodiment.

FIG. 5 is flowchart illustrating a method of selecting an LCC method based on a second decision metric, according to an embodiment. Specifically, FIG. 5 illustrate a method of selecting an LCC method based on an average capacity difference ($\Delta C_{avg}$).

Referring to FIG. 5, in step 501, the UE determines the PMI selection decision metric as $\Delta C_{avg}$ e.g., as shown above in Equation (33).

In step 502, the UE determines whether the $\Delta C_{avg} > 0$.

If $\Delta C_{avg} > 0$ in step 502, then the UE selects the SB LCC selection method in step 503. However, if t $\Delta C_{avg} \leq 0$ in step 502, then the UE selects the WB selection method or the SBG LCC selection method in steps 504 to 506.

More specifically, in step 504, the UE determines if $N_3$ is even and $N_3 < N_{MAX}$.

If $N_3$ is even and $N_3 < N_{MAX}$ in step 504, then the UE selects the SBG LCC selection method in step 505. However, if $N_3$ is odd or $N_3 \geq N_{MAX}$ in step 504, then the UE selects the WB LCC selection method in step 506.

Figure 6:
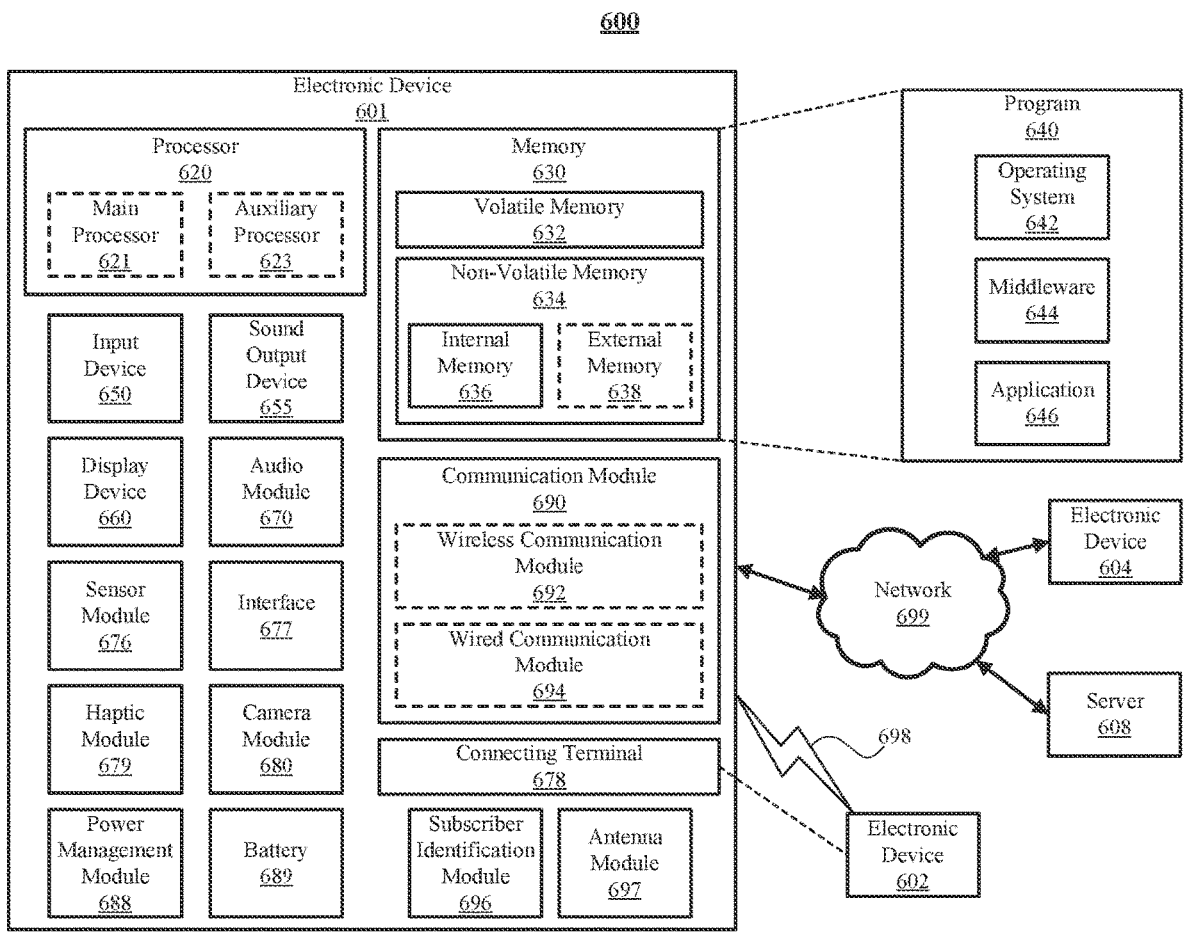
FIG. 6 illustrates an electronic device in a network environment, according to an embodiment.

FIG. 6 illustrates an electronic device in a network environment, according to an embodiment. For example, the election device in FIG. 6 may perform the UE operations as described above with reference to FIGS. 1-5.

Referring to FIG. 6, the electronic device 601, e.g., a UE or mobile terminal including GPS functionality, in the network environment 600 may communicate with an electronic device 602 via a first network 698 (e.g., a short-range wireless communication network), or an electronic device 604 or a server 608 via a second network 699 (e.g., a long-range wireless communication network). The electronic device 601 may communicate with the electronic device 604 via the server 608. The electronic device 601 may include a processor 620, a memory 630, an input device 650, a sound output device 655, a display device 660, an audio module 670, a sensor module 676, an interface 677, a haptic module 679, a camera module 680, a power management module 688, a battery 689, a communication module 690, a subscriber identification module (SIM) 696, or an antenna module 697 including a GNSS antenna. In one embodiment, at least one (e.g., the display device 660 or the camera module 680) of the components may be omitted from the electronic device 601, or one or more other components may be added to the electronic device 601. In one embodiment, some of the components may be implemented as a single integrated circuit (IC). For example, the sensor module 676 (e.g., a fingerprint sensor, an iris sensor, or an illuminance sensor) may be embedded in the display device 660 (e.g., a display).

The processor 620 may execute, for example, software (e.g., a program 640) to control at least one other component (e.g., a hardware or a software component) of the electronic device 601 coupled with the processor 620, and may perform various data processing or computations. As at least part of the data processing or computations, the processor 620 may load a command or data received from another component (e.g., the sensor module 676 or the communication module 690) in volatile memory 632, process the command or the data stored in the volatile memory 632, and store resulting data in non-volatile memory 634. The processor 620 may include a main processor 621 (e.g., a central processing unit (CPU) or an application processor, and an auxiliary processor 623 (e.g., a graphics processing unit (GPU), an image signal processor (ISP), a sensor hub processor, or a communication processor (CP)) that is operable independently from, or in conjunction with, the main processor 621. Additionally or alternatively, the auxiliary processor 623 may be adapted to consume less power than the main processor 621, or execute a particular function. The auxiliary processor 623 may be implemented as being separate from, or a part of, the main processor 621.

The auxiliary processor 623 may control at least some of the functions or states related to at least one component (e.g., the display device 660, the sensor module 676, or the communication module 690) among the components of the electronic device 601, instead of the main processor 621 while the main processor 621 is in an inactive (e.g., sleep) state, or together with the main processor 621 while the main processor 621 is in an active state (e.g., executing an application). According to one embodiment, the auxiliary processor 623 (e.g., an image signal processor or a communication processor) may be implemented as part of another component (e.g., the camera module 680 or the communication module 690) functionally related to the auxiliary processor 623.

The memory 630 may store various data used by at least one component (e.g., the processor 620 or the sensor module 676) of the electronic device 601. The various data may include, for example, software (e.g., the program 640) and input data or output data for a command related thereto. The memory 630 may include the volatile memory 632 or the non-volatile memory 634.

The program 640 may be stored in the memory 630 as software, and may include, for example, an operating system (OS) 642, middleware 644, or an application 646.

The input device 650 may receive a command or data to be used by other component (e.g., the processor 620) of the electronic device 601, from the outside (e.g., a user) of the electronic device 601. The input device 650 may include, for example, a microphone, a mouse, or a keyboard.

The sound output device 655 may output sound signals to the outside of the electronic device 601. The sound output device 655 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 660 may visually provide information to the outside (e.g., a user) of the electronic device 601. The display device 660 may include, for example, a display, a hologram device, or a projector and control circuitry to control a corresponding one of the display, hologram device, and projector. According to one embodiment, the display device 660 may include touch circuitry adapted to detect a touch, or sensor circuitry (e.g., a pressure sensor) adapted to measure the intensity of force incurred by the touch.

The audio module 670 may convert a sound into an electrical signal and vice versa. According to one embodiment, the audio module 670 may obtain the sound via the input device 650, or output the sound via the sound output device 655 or a headphone of an external electronic device 602 directly (e.g., wiredly) or wirelessly coupled with the electronic device 601.

The sensor module 676 may detect an operational state (e.g., power or temperature) of the electronic device 601 or an environmental state (e.g., a state of a user) external to the electronic device 601, and then generate an electrical signal or data value corresponding to the detected state. The sensor module 676 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 677 may support one or more specified protocols to be used for the electronic device 601 to be coupled with the external electronic device 602 directly (e.g., wiredly) or wirelessly. According to one embodiment, the interface 677 may include, for example, a high definition multimedia interface (HDMI), a universal serial bus (USB) interface, a secure digital (SD) card interface, or an audio interface.

A connecting terminal 678 may include a connector via which the electronic device 601 may be physically connected with the external electronic device 602. According to one embodiment, the connecting terminal 678 may include, for example, an HDMI connector, a USB connector, an SD card connector, or an audio connector (e.g., a headphone connector).

The haptic module 679 may convert an electrical signal into a mechanical stimulus (e.g., a vibration or a movement) or an electrical stimulus which may be recognized by a user via tactile sensation or kinesthetic sensation. According to one embodiment, the haptic module 679 may include, for example, a motor, a piezoelectric element, or an electrical stimulator.

The camera module 680 may capture a still image or moving images. According to one embodiment, the camera module 680 may include one or more lenses, image sensors, image signal processors, or flashes.

The power management module 688 may manage power supplied to the electronic device 601. The power management module 688 may be implemented as at least part of, for example, a power management integrated circuit (PMIC).

The battery 689 may supply power to at least one component of the electronic device 601. According to one embodiment, the battery 689 may include, for example, a primary cell which is not rechargeable, a secondary cell which is rechargeable, or a fuel cell.

The communication module 690 may support establishing a direct (e.g., wired) communication channel or a wireless communication channel between the electronic device 601 and the external electronic device (e.g., the electronic device 602, the electronic device 604, or the server 608) and performing communication via the established communication channel. The communication module 690 may include one or more communication processors that are operable independently from the processor 620 (e.g., the application processor) and supports a direct (e.g., wired) communication or a wireless communication. According to one embodiment, the communication module 690 may include a wireless communication module 692 (e.g., a cellular communication module, a short-range wireless communication module, or a global navigation satellite system (GNSS) communication module) or a wired communication module 694 (e.g., a local area network (LAN) communication module or a power line communication (PLC) module). A corresponding one of these communication modules may communicate with the external electronic device via the first network 698 (e.g., a short-range communication network, such as Bluetooth™, wireless-fidelity (Wi-Fi) direct, or a standard of the Infrared Data Association (IrDA)) or the second network 699 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 692 may identify and authenticate the electronic device 601 in a communication network, such as the first network 698 or the second network 699, using subscriber information (e.g., international mobile subscriber identity (IMSI)) stored in the subscriber identification module 696.

The antenna module 697 may transmit or receive a signal or power to or from the outside (e.g., the external electronic device) of the electronic device 601. According to one embodiment, the antenna module 697 may include one or more antennas, and, therefrom, at least one antenna appropriate for a communication scheme used in the communication network, such as the first network 698 or the second network 699, may be selected, for example, by the communication module 690 (e.g., the wireless communication module 692). The signal or the power may then be transmitted or received between the communication module 690 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 601 and the external electronic device 604 via the server 608 coupled with the second network 699. Each of the electronic devices 602 and 604 may be a device of a same type as, or a different type, from the electronic device 601. All or some of operations to be executed at the electronic device 601 may be executed at one or more of the external electronic devices 602, 604, or 608. For example, if the electronic device 601 should perform a function or a service automatically, or in response to a request from a user or another device, the electronic device 601, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 601. The electronic device 601 may provide the outcome, with or without further processing of the outcome, as at least part of a reply to the request. To that end, a cloud computing, distributed computing, or client-server computing technology may be used, for example.

One embodiment may be implemented as software (e.g., the program 640) including one or more instructions that are stored in a storage medium (e.g., internal memory 636 or external memory 638) that is readable by a machine (e.g., the electronic device 601). For example, a processor of the electronic device 601 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

As presented in the above-described embodiments, an SB LCC selection method is not always the best approach for dealing with frequency-selective channels. Therefore, alternative approaches are provided (i.e., WB or SBG LCC selection), based on WB capacity maximization, which outperform SB LCC selection methods under medium/high-selectivity channel conditions. The WB and SBG methods are fully compatible with existing frequency domain compression (FDC) framework (e.g., the eType-II codebook of NR Rel-16), and therefore, do not require any specification change or additional signaling.

Additionally, adaptive methods are also provided that dynamically switch between SB LCC selection method, WB, and SBG methods depending on the instantaneous channel, thereby providing consistent performance improvements. For example, simulation results using WB or SBG LCC selection show that the proposed methods achieve gains up to 2.5 dB over legacy eType-II PMI selection.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method performed by a user equipment (UE), the method comprising:
    determining a precoding matrix indicator (PMI) selection decision metric;
    selecting one of a sub-band (SB) linear combination coefficient (LCC) selection method, a wideband (WB) LCC selection method, or a sub-band group (SBG) LCC selection method, based on the determined PMI selection decision metric;
    determining, using the selected LCC selection method, PMI indices based on sub-bands configured by a base station; and
    transmitting the determined PMI indices to the base station.

2. The method of claim 1, wherein the determined PMI selection decision metric includes a ratio between LCC energy after frequency domain (FD) compression and LCC energy before FD compression.

3. The method of claim 2, wherein selecting one of the SB LCC selection method, the WB LCC selection method, or the SBG LCC selection method comprises:
    comparing the ratio with a threshold;
    selecting the SB LCC selection method, in response to the ratio being greater than the threshold; and
    selecting one of the WB LCC selection method or the SBG LCC selection method, in response to the ratio being less than or equal to the threshold.

4. The method of claim 3, wherein selecting one of the WB LCC selection method or the SBG LCC selection method comprises selecting the SBG LCC selection method, in response to an SB grouping achieving lossless compression.

5. The method of claim 3, wherein selecting one of the WB LCC selection method or the SBG LCC selection method comprises:
    determining a number of the sub-bands configured by the base station and a maximum number of sub-bands; and
    selecting one of the WB LCC selection method or the SBG LCC selection method, based on a comparison of the number of the sub-bands configured by the base station and the maximum number of sub-bands, and whether the number of the sub-bands configured by the base station is odd or even.

6. The method of claim 5, wherein selecting one of the WB LCC selection method or the SBG LCC selection method, based on the comparison of the number of the sub-bands configured by the base station and the maximum number of sub-bands, and whether the number of the sub-bands configured by the base station is odd or even comprises:
    selecting the SBG LCC selection method, in response to the number of the sub-bands configured by the base station being less than the maximum number of sub-bands, and the number of the sub-bands configured by the base station being even; and
    selecting the WB LCC selection method, in response to the number of the sub-bands configured by the base station being greater than or equal to the maximum number of sub-bands, or the number of the sub-bands configured by the base station being odd.

7. The method of claim 1, wherein the determined PMI selection decision metric includes an average capacity difference.

8. The method of claim 7, wherein selecting one of the SB LCC selection method, the WB LCC selection method, or the SBG LCC selection method comprises:
    selecting the SB LCC selection method, in response to the average capacity difference being greater than 0; and
    selecting one of the WB LCC selection method or the SBG LCC selection method, in response to the average capacity difference being less than or equal to 0.

9. The method of claim 8, wherein selecting one of the WB LCC selection method or the SBG LCC selection comprises selecting the SBG LCC selection method, in response to an SB grouping achieving lossless compression.

10. The method of claim 8, wherein selecting one of the WB LCC selection method or the SBG LCC selection method comprises:
    determining a number of the sub-bands configured by the base station and a maximum number of sub-bands; and
    selecting one of the WB LCC selection method or the SBG LCC selection method, based on a comparison of the number of the sub-bands configured by the base station and the maximum number of sub-bands, and whether the number of the sub-bands configured by the base station is odd or even.

11. The method of claim 10, wherein selecting one of the WB LCC selection method or the SBG LCC selection method, based on the comparison of the number of the sub-bands configured by the base station and the maximum number of sub-bands, and whether the number of the sub-bands configured by the base station is odd or even comprises:
    selecting the SBG LCC selection method, in response to the number of the sub-bands configured by the base station being less than the maximum number of sub-bands, and the number of the sub-bands configured by the base station being even; and
    selecting the WB LCC selection method, in response to the number of the sub-bands configured by the base station being greater than or equal to the maximum number of sub-bands, or the number of the sub-bands configured by the base station being odd.

12. The method of claim 1, wherein the WB LCC selection method comprises:
    determining a single LCC matrix for an entire band; and
    mapping the single matrix to PMI indices corresponding the SB LCC selection method.

13. The method of claim 1, wherein the SBG LCC selection method comprises:
    determining a set of LCC matrices, wherein a total number of matrices included in the set of the LCC matrices is less than a number of discrete Fourier transform (DFT) components utilized in the SB LCC selection method; and
    mapping the set of LCC matrices to PMI indices corresponding the SB LCC selection method.

14. A user equipment (UE), comprising:
    a transceiver; and
    a processor configured to:
        determine a precoding matrix indicator (PMI) selection decision metric, select one of a sub-band (SB) linear combination coefficient (LCC) selection method, a wideband (WB) LCC selection method, or a sub-band group (SBG) LCC selection method, based on the determined PMI selection decision metric, determine, using the selected LCC selection method, PMI indices based on sub-bands configured by a base station; and transmit, via the transceiver, the determined PMI indices to the base station.

15. The UE of claim 14, wherein the determined PMI selection decision metric includes a ratio between LCC energy after frequency domain (FD) compression and LCC energy before FD compression.

16. The UE of claim 15, wherein the processor is further configured to:

compare the ratio with a threshold, select the SB LCC selection method, in response to the ratio being greater than the threshold, and select one of the WB LCC selection method or the SBG LCC selection method, in response to the ratio being less than or equal to the threshold.

17. The UE of claim 16, wherein the processor is further configured to select the SBG LCC selection method, in response to an SB grouping achieving lossless compression.

18. The UE of claim 16, wherein the processor is further configured to:

determine a number of the sub-bands configured by the base station and a maximum number of sub-bands, and select one of the WB LCC selection method or the SBG LCC selection method, based on a comparison of the number of the sub-bands configured by the base station and the maximum number of sub-bands, and whether the number of the sub-bands configured by the base station is odd or even.

19. The UE of claim 18, wherein the processor is further configured to:

select the SBG LCC selection method, in response to the number of the sub-bands configured by the base station being less than the maximum number of sub-bands, and the number of the sub-bands configured by the base station being even; and select the WB LCC selection method, in response to the number of the sub-bands configured by the base station being greater than or equal to the maximum number of sub-bands, or the number of the sub-bands configured by the base station being odd.

20. The UE of claim 14, wherein the determined PMI selection decision metric includes an average capacity difference.

21. The UE of claim 20, wherein the processor is further configured to:

select the SB LCC selection method, in response to the average capacity difference being greater than 0; and select one of the WB LCC selection method or the SBG LCC selection method, in response to the average capacity difference being less than or equal to 0.

22. The UE of claim 21, wherein the processor is further configured to select the SBG LCC selection method, in response to an SB grouping achieving lossless compression.

23. The UE of claim 21, wherein the processor is further configured to:

determine a number of the sub-bands configured by the base station and a maximum number of sub-bands, and select one of the WB LCC selection method or the SBG LCC selection method, based on a comparison of the number of the sub-bands configured by the base station and the maximum number of sub-bands, and whether the number of the sub-bands configured by the base station is odd or even.

24. The UE of claim 23, wherein the processor is further configured to:

select the SBG LCC selection method, in response to the number of the sub-bands configured by the base station being less than the maximum number of sub-bands, and the number of the sub-bands configured by the base station being even; and select the WB LCC selection method, in response to the number of the sub-bands configured by the base station being greater than or equal to the maximum number of sub-bands, or the number of the sub-bands configured by the base station being odd.

25. The UE of claim 14, wherein the WB LCC selection method comprises:

determining a single LCC matrix for an entire band; and mapping the single matrix to PMI indices corresponding the SB LCC selection method.

26. The UE of claim 14, wherein the SBG LCC selection method comprises:

determining a set of LCC matrices, wherein a total number of matrices included in the set of the LCC matrices is less than a number of discrete Fourier transform (DFT) components utilized in the SB LCC selection method; and mapping the set of LCC matrices to PMI indices corresponding the SB LCC selection method.

* * * * *